United States Patent
Sobel et al.

(10) Patent No.: US 8,312,547 B1
(45) Date of Patent: Nov. 13, 2012

(54) ANTI-MALWARE SCANNING IN A PORTABLE APPLICATION VIRTUALIZED ENVIRONMENT

(75) Inventors: William E. Sobel, Stevenson Ranch, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1262 days.

(21) Appl. No.: 12/059,764

(22) Filed: Mar. 31, 2008

(51) Int. Cl.
*H04L 29/06* (2006.01)

(52) U.S. Cl. ............ 726/24; 726/2; 726/3; 726/23; 726/25; 713/188; 713/189; 713/193; 709/227; 709/228; 707/705; 707/754; 707/821; 707/736

(58) Field of Classification Search .................. None
See application file for complete search history.

(56) References Cited

U.S. PATENT DOCUMENTS

| | | | |
|---|---|---|---|
| 6,944,769 B1* | 9/2005 | Daniels et al. | 713/188 |
| 7,162,724 B2* | 1/2007 | Blaser et al. | 719/328 |
| 7,272,831 B2* | 9/2007 | Cota-Robles et al. | 718/1 |
| 7,577,686 B1* | 8/2009 | Larkin et al. | 1/1 |
| 7,743,422 B2* | 6/2010 | Narayanaswami et al. | 726/25 |
| 7,757,290 B2* | 7/2010 | Costea et al. | 726/24 |
| 7,797,748 B2* | 9/2010 | Zheng et al. | 726/24 |
| 7,853,999 B2* | 12/2010 | Khilnani et al. | 726/14 |
| 7,975,304 B2* | 7/2011 | Lu | 726/24 |
| 8,010,667 B2* | 8/2011 | Zhang et al. | 709/224 |
| 8,104,088 B2* | 1/2012 | Khilnani et al. | 726/24 |
| 8,117,314 B2* | 2/2012 | Croft et al. | 709/227 |
| 2004/0123127 A1* | 6/2004 | Teicher et al. | 713/193 |
| 2007/0005919 A1* | 1/2007 | van Riel | 711/163 |
| 2007/0271472 A1* | 11/2007 | Grynberg | 713/193 |
| 2008/0098478 A1* | 4/2008 | Vaidya et al. | 726/24 |
| 2008/0168188 A1* | 7/2008 | Yue et al. | 710/15 |
| 2008/0263658 A1* | 10/2008 | Michael et al. | 726/22 |
| 2009/0055896 A1* | 2/2009 | Aoki et al. | 726/3 |
| 2009/0126016 A1* | 5/2009 | Sobko et al. | 726/23 |
| 2009/0293057 A1* | 11/2009 | Larkin et al. | 718/1 |
| 2009/0307452 A1* | 12/2009 | Hahn et al. | 711/164 |
| 2010/0306773 A1* | 12/2010 | Lee et al. | 718/1 |
| 2011/0219453 A1* | 9/2011 | Turbin | 726/24 |
| 2011/0289548 A1* | 11/2011 | Heidenreich et al. | 726/1 |
| 2012/0036571 A1* | 2/2012 | Yoo | 726/13 |
| 2012/0036572 A1* | 2/2012 | Yoo | 726/13 |
| 2012/0124007 A1* | 5/2012 | Sten et al. | 707/685 |

OTHER PUBLICATIONS

Gottesman, B., "U3", PCMag.com, Sep. 21, 2005, 3 pages, [online] [Retrieved on Jan. 5, 2009] Retrieved from the Internet <URL:http://www.pcmag.com/print_article2/0,1217,a%253D160609,00.asp>.
Mossberg, W. et al., "Turning Another Computer Into Your Own", WSJ.com, The Mossberg Solution, Oct. 18, 2006, 4 pages, [online] [Retrieved on Jan. 5, 2009] Retrieved from the Internet <URL:http://online.wsj.com/public/article/SB116113166328095945-Ww4BXcJDokc_qfo_mFgJYsBjIPQ_20071017.html?mod=rss_personal_technology#printMode>.

* cited by examiner

*Primary Examiner* — Syed A. Zia
(74) *Attorney, Agent, or Firm* — Fenwick & West LLP

(57) ABSTRACT

A computer includes a portable environment including a portable file system located on a removable storage device, the portable environment using virtualization in a host operating system. A path translation module translates a virtualized path of a file in the portable file system to an actual path of the file. The virtualized path is the path in the context of a portable user application running in the portable environment, and the actual path is the path in the context of the host operating system. A malware detection module executing directly under the host operating system determines whether the file contains malware using the actual path of the file and takes remedial actions if malware is detected.

19 Claims, 4 Drawing Sheets

ANTI-MALWARE SCANNING IN A PORTABLE APPLICATION VIRTUALIZED ENVIRONMENT

BACKGROUND

1. Field of the Invention

This invention pertains in general to protecting a computer from malicious software and in particular to techniques for anti-malware scanning in a portable application virtualized environment.

2. Description of the Related Art

Software portability products such as MOJOPAC by RingCube Technologies, Inc. or U3 enabled portable drives by U3 LLC create a portable self-contained computing environment that travels from computer to computer. For example, a user can connect a software portability product to any compatible host computer and be able to use his or her portable computing environment on that computer. The connection can be made through a Universal Serial Bus (USB) interface. The portable computing environment provides the user with files, applications, and application and operating system settings desired by the user.

These software portability products, also referred to as software virtualization products, use light weight virtualization technology. Examples of light weight virtualization include Alitris Software Virtualization Solution (SVS), U3's portable environment, and MOJOPAC. This technology involves a portable software stack that uses the computing resources of the host computer up to and including the operating system of the host computer. The portable software stack provides its own file system and registry redirection drivers layered above the resources provided by the host computer. Applications are layered on top of the stack and from their perspective execute natively. The redirection drivers, also referred to as filter drivers, intercept file system and registry changes and store those changes in the portable computing environment.

For example, a user's files in the portable environment may appear to the user to be in the C: drive in standard directories used by the WINDOWS VISTA operating system. However, the actual location of the files, as known to the host operating system operating on the host computer, may be on a removable storage device in the E: drive. Similarly, the user applications in the portable environment are provided with a standard registry that is accessible through standard registry access functions. However, this registry is not the registry used by the host operating system but rather a registry stored in a file or files local to the portable environment.

Malicious software, or malware, such as viruses or worms may enter the portable environment and store itself in files or settings in the portable environment. Anti-malware scanning is a technique for examining files and settings to detect malware. However, anti-malware scanning may not work properly for a portable environment. If the anti-malware scan is run from within a host operating system of the portable environment, the anti-malware scan may fail to detect malware in the portable environment. Therefore, there is a need in the art for a way to perform an anti-malware scan of a portable environment.

BRIEF SUMMARY OF THE INVENTION

The above need is met by a system, method, and computer program product for scanning for malware in a computer having a portable environment including a portable file system located on a removable storage device, where the portable environment uses virtualization in a host operating system. In an embodiment of the system and computer program product, a path translation module for translates a virtualized path of a file in the portable file system to an actual path of the file. The virtualized path is the path in the context of a portable user application running in the portable environment, and the actual path is the path in the context of the host operating system. A malware detection module executing directly under the host operating system determines whether the file contains malware using the actual path of the file, and takes remedial actions if malware is detected.

In an embodiment of the method, a computer-implemented method of scanning for malware in a computer having a portable environment including a portable file system located on a removable storage device, the portable environment using virtualization in a host operating system comprises translating a virtualized path of a file in the portable file system to an actual path of the file. The virtualized path is the path in the context of a portable user application running in the portable environment, and the actual path is the path in the context of the host operating system. The method also includes determining, from a module executing directly under the host operating system, whether the file contains malware using the actual path of the file.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
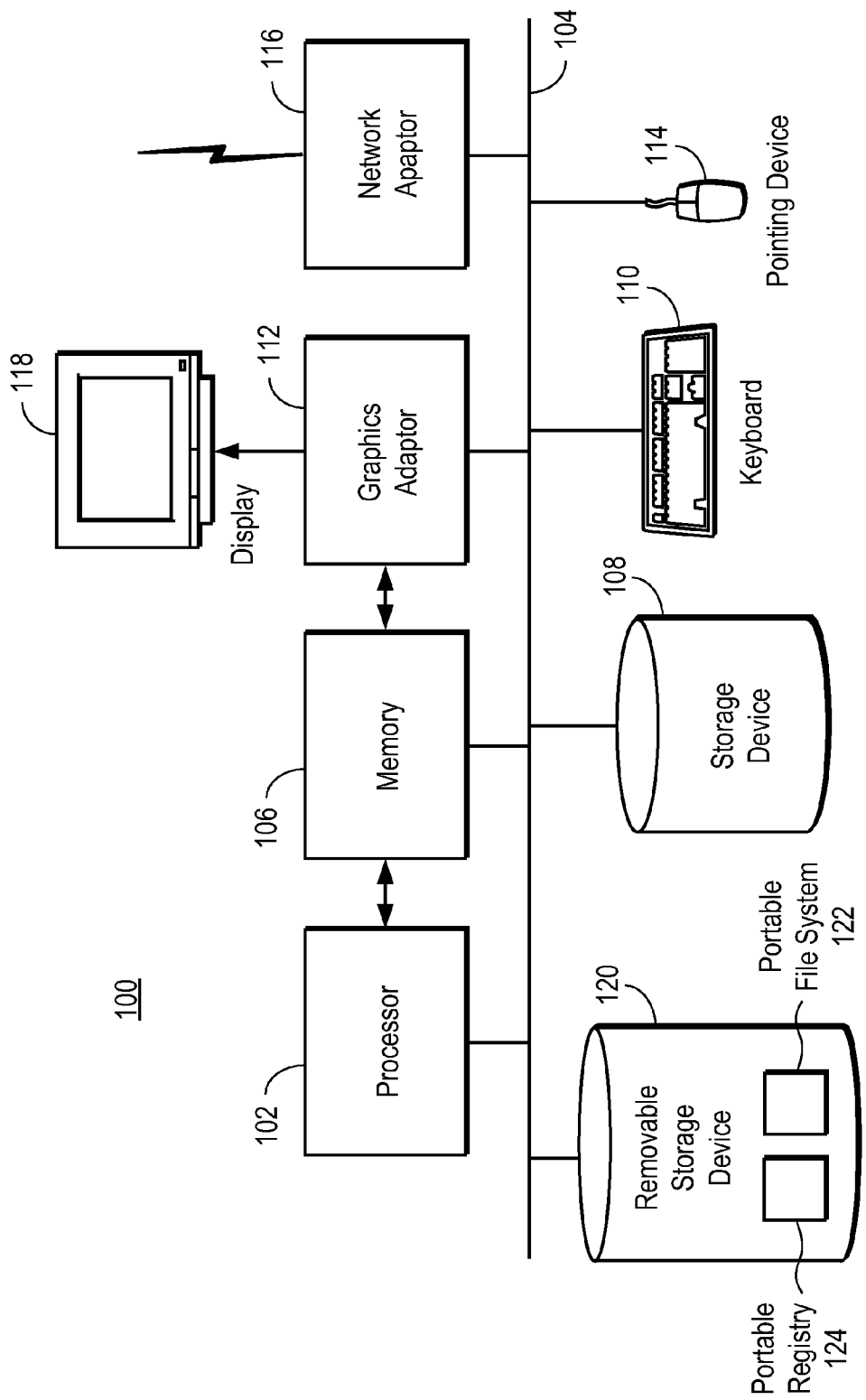
FIG. 1 is a high-level block diagram illustrating a computer interfacing with a portable environment according to one embodiment.

FIG. 1 is a high-level block diagram illustrating a computer interfacing with a portable environment according to one embodiment. Illustrated are at least one processor 102 coupled to a bus 104. Also coupled to the bus 104 are a memory 106, a storage device 108, a removable storage device 120, a keyboard 110, a graphics adapter 112, a pointing device 114, and a network adapter 116. A display 118 is coupled to the graphics adapter 112. The storage device 108 and removable storage device 120 are devices such as a hard drives, CD or DVD drives, or flash memory devices, and hold files containing executable code and/or data utilized during the operation of the computer 100. The memory 106, in one embodiment, is a random access memory (RAM) and holds instructions and data loaded from the storage device 108 or removable storage device 120, generated during processing, and/or from other sources.

The removable storage device 120 can be easily removed from the computer 100 and connected to another computer, in one embodiment. The removable storage device 120 can connect to the computer 100 through a Universal Serial Bus (USB) interface. The removable storage device 120 contains a portable registry 124 and a portable file system 122. The portable registry 124 contains configuration settings that may be organized in the format of the WINDOWS Registry. The portable file system 122 is a file system such as the New Technology File System (NTFS) used by some versions of MICROSOFT WINDOWS or the third extended file system (ext3) used by some versions of LINUX.

A portable environment is instantiated on the computer 100 by running an application program that can be stored on the removable storage device 120. The portable environment runs on the processor 102, uses the memory 106, and accesses the portable file system 122 and portable registry 124. An anti-malware scanner is run on the computer 100 to scan the portable file system 122 and portable registry 124 to detect malware in the portable environment. The portable environment and anti-malware scanner are described further below.

Computers acting in different roles may have different and/or additional elements than the ones shown in FIG. 1. For example, a computer 100 acting as a server may have greater processing power and a larger storage device than a computer acting as a client. Likewise, a computer 100 acting as a server may lack devices such as a display 118 and/or keyboard 110 that are not necessarily required to operate it.

The computer 100 executes one or more operating systems such as a variant of MICROSOFT WINDOWS or LINUX. In one embodiment, the computer runs a version of WINDOWS VISTA. In general, the operating system executes one or more application programs.

The operating system and application programs executed by the computer are formed of one or more processes. This description utilizes the term "module" to refer to computer program logic for providing a specified functionality. A module can be implemented in hardware, firmware, and/or software. A module is typically stored on the storage device 108, loaded into the memory 106, and executed by the processor 102. A module can include one or more processes, and/or be provided by only part of a process.

Figure 2:
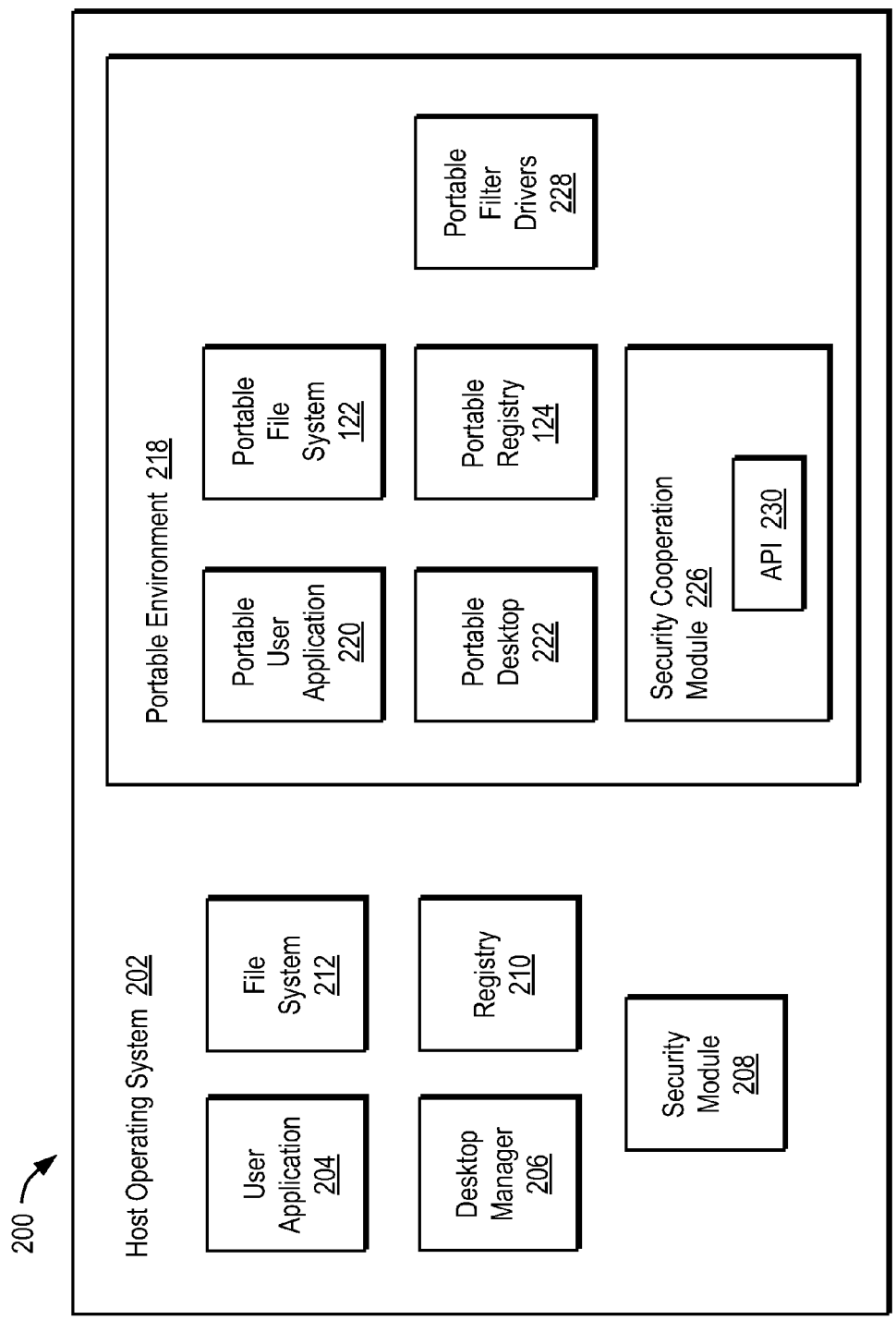
FIG. 2 is a high-level block diagram illustrating the functional modules within a computing environment running on the processor according to one embodiment.

FIG. 2 is a high-level block diagram illustrating the functional modules within a computing environment 200 running on the processor 102 according to one embodiment. The environment 200 includes a host operating system 202 that runs on the processor 102. The host operating system 202 is a standard operating system such as a version of WINDOWS VISTA. The operating system 202 can run user applications 204 and has a file system 212 that includes files stored on the storage device 108. File system 212 includes the root and system directories used by the host operating system 202.

The host operating system 202 also includes a registry 210 containing configuration settings for the host operating system and user applications 204. The settings in the registry 210 may be stored as keys organized in a hierarchical format. The registry 210 includes the root keys for the host operating system 202.

The desktop manager 206 manages one or more desktops for the host operating system 202. A desktop is a graphical screen shown on the display 118 and provided to the user for interacting with the host operating system 202 and user applications 204. The desktop manager 206 can create and configure desktops and can control which desktop is currently displayed to the user.

The security module 208 scans the portable environment 218, including the portable file system 122 and portable registry 124, for malicious software, or malware, such as viruses and worms. If a file with malware is detected, a remedial action can be taken such as removing the malware or alerting a user of the portable environment 218. The security module 208 can be an application, process, or service running in the host operating system 202. The security module 208 can also scan the file system 212 and registry 210 of the host operating system 202. The security module 208 is described further below.

The security module 208 may scan only some of the files in the portable file system 122, such as the files that are likely to be accessed and executed. This type of scanning is referred to as a quick scan. The security module 208 may be provided with predetermined locations to scan or may scan locations determined based on commands from a user. For example, a quick scan may include the home folders and startup folders of all users and certain shared folders that are frequently accessed.

The portable environment 218, also referred to as a virtualized environment or a portable application virtualized environment, is an environment that a user can transport from one compatible computer to another. The portable environment 218 provides the user with the files, applications, and settings desired by the user, while the files, applications, and settings of the host operating system 202 may vary from one computer to another. In one embodiment, the portable environment 218 is started when a user connects a removable storage device 120 to the computer 100. An application on the removable storage device 120 is automatically or manually run to instantiate the portable environment 218. The portable environment 218 uses light weight virtualization technology, running within the host operating system 202 and using resources of the computer 100 and the host operating system.

The portable desktop 222 is a desktop used by the portable environment 218. The portable environment 218 may use more than one portable desktops 222. The portable environment 218 obtains a desktop for its use from the desktop manager 206. The portable environment 218 initially configures the portable desktop 222 according the settings obtained from the removable storage device 120, for example from the portable registry 124 described below. When the user is interacting with the portable environment 218, the desktop manager 206 displays the portable desktop 222 to the user.

The portable user application 220 is a user application running in the portable environment. By being in the portable environment 218, the application can behave the same way from the user's point of view even when running on differently-configured host operating systems 202. The portable user application 220 accesses the portable registry 124 and portable file system 122, described below, rather than the file system 212 and registry 210 of the host operating system 202. The portable user application 220 can interact with the user through the portable desktop 222.

The portable file system 122 is the file system available to a user or portable user application 220 of the portable environment 218. A portable user application 220 reads and writes to the portable file system 122 rather than to the file system 212 of the host operating system 202. The portable file system 122 is stored on the removable storage device 120 and is available to both the portable environment 218 and the host operating system 202. However, the path associated with a file in the portable file system 122 is different in the context of the host operating system 202 versus the context of the portable environment 218. For example, a file in the portable file system 122 may appear as "C:\UserA\Document.txt" to portable user applications 220 in the portable environment 218 while appearing as "E:\PortEnvRoot\C\UserA\Document.txt" to user applications 204 and the security module 208 in the host operating system 202. In this example, "E:" is the drive assigned by the host operating system to the removable storage device 120.

The path of a file in the context of the portable environment 218 is referred to as the virtualized path of the file, while the path of the file in the context of the host operating system 202 is referred to as the actual path or true path of the file. The process of converting a virtualized path to an actual path or converting an actual path to a virtualized path is referred to as path translation. In the example given above, path translation from a virtual path "C:\UserA\Document.txt" to an actual path "E:\PortEnvRoot\C\UserA\Document.txt" can be performed by adding "E:\PortEnvRoot\" to the beginning of the virtual path and removing the colon after the 'C'.

The portable registry 124 is the registry available to portable user applications 220. The portable registry 124 contains settings for users and portable user applications 220 of the portable environment 218. A portable user application 220 reads and writes to the portable registry 124 rather than to the registry 210 of the host operating system 202. The portable registry is stored on the removable storage device 120.

The portable filter drivers 228 redirect file and registry accesses by portable user applications 220 to the portable file system 122 and the portable registry 124. As mentioned above, the portable environment 218 uses the services of the host operating system 202. In particular, a portable user application 220 uses system calls provided by the host operating system 202 to access a file. However, as mentioned above, the portable user application 220 knows the file by only its virtualized path while the host operating system knows the file by only its actual path. If the portable user application 220 makes the system call using the virtualized path, and if no path translation is performed, the host operating system will not be able to locate the correct file. Therefore, the portable filter drivers 228 perform path translations on paths used in system calls by portable user applications 220. The portable filter drivers 228 can also perform path translation on paths that are returned from the host operating system 202 to a portable user application 220 in response to a system call.

By performing path translation on files, the portable filter drivers 228 are able to redirect file accesses by portable user applications 220 to the correct locations. The portable filter drivers 228 also redirect registry accesses by portable user applications. The registry 210 of the host operating system 202 is located in a file or files in the system directory of the file system 212 of the host operating system 202. The portable registry 124, however, is located in a file or files on the removable storage device 120. The portable filter drivers 228 detect when a portable user application 220 attempts to access the registry 210 (e.g., through a system call), and redirects the access to the portable registry 124.

As mentioned above, it is desired to perform an anti-malware scan of the portable environment 218, including the portable file system 122 and portable registry 124. It is possible for this anti-malware scanning program to run as a portable user application 220 from within the portable environment 218. However, such an approach may not maximize security.

Generally, an anti-malware scanner is best able to defend a computer when it is deployed before the malware arrives. In a computer containing attacking code (e.g., malware) and defending code (e.g., anti-malware scanner), the attacking code is less likely to defeat the defending code if the defending code is installed first or is operating at a higher privilege level than the attacking code. If the defending code is designed to run from within the portable environment, the attacking code can be waiting on the host before the portable environment is instantiated and before the defending code is deployed. Therefore, a security module 208 that performs an anti-malware scan of the portable environment 218 provides greater security if it is run from outside of the portable environment, directly from the host operating system 202.

The security module 208 scans the portable environment 218, including the portable file system 122 and portable registry 124, for malicious software, or malware, such as viruses and worms. If a file with malware is detected, a remedial action can be taken such as removing the malware or alerting a user of the portable environment 218. The security module 208 can be an application, process, or service running in the host operating system 202. The security module 208 can also scan the file system 212 and registry 210 of the host operating system 202. The security module 208 is described further below.

In one embodiment, the security cooperation module 226 enables the security module 208 to scan the portable environment 218 for malware by providing information about the portable environment 218 to the security module 208. The security cooperation module 226 may also include an application program interface (API) 230 that is used by the security module 208 to perform services that assist the security module in scanning the portable environment. The security cooperation module 226 runs in the portable environment 218 and is instantiated by the portable environment 218.

The portable environment 218 may or may not include a security cooperation module 226, depending on the design of the portable environment. If the portable environment 218 is designed to be aware of and to cooperate with a security module 208, then the portable environment will likely include a security cooperation module 226. However, even if the portable environment 218 does not include a security cooperation module 226, the security module 208 may still be able to scan the portable environment, as described below.

Figure 3:
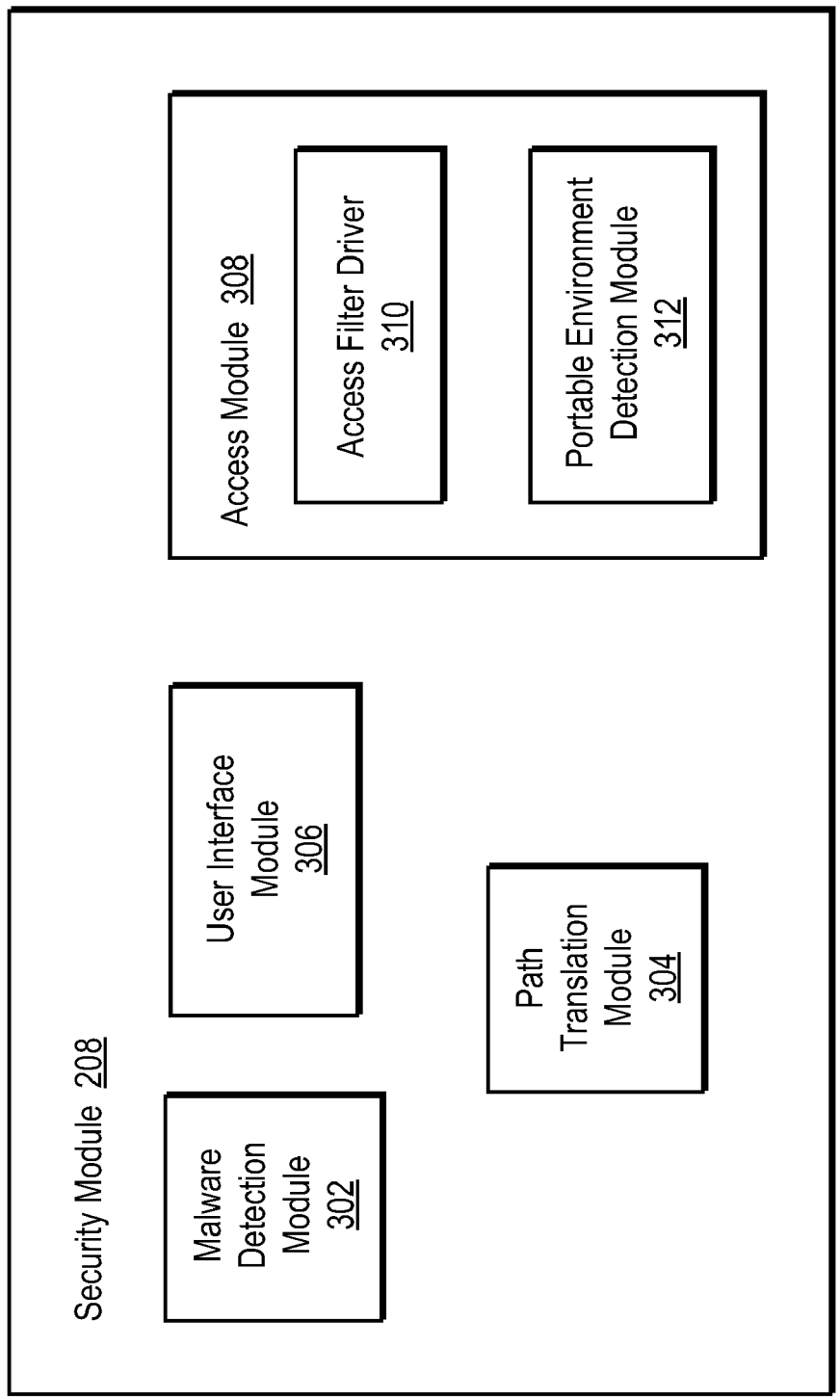
FIG. 3 is a high-level block diagram illustrating the functional modules within the security module according to one embodiment.

FIG. 3 is a high-level block diagram illustrating the functional modules within the security module according to one embodiment. The security module 208 includes a malware detection module 302, a path translation module 304, a user interface module 306, and an access module 308. The access module 308 includes a access filter driver 310 and a portable environment detection module 312.

The access module 308 obtains information about the portable environment 218 for use by the security module 208. This information enables the security module 208 to scan the correct files and registry entries in the portable environment 218 and to interact with a user of the portable environment.

If the portable environment 218 includes a security cooperation module 226, then the security cooperation module can provide the access module 308 with information about the portable environment. The security cooperation module 226 and access module 308 can communicate through standard methods provided by the host operating system 202 such as inter-process communication or message passing.

After the portable environment 218 is instantiated, the security cooperation module 226 communicates to the access module 308 that the portable environment has started. The security cooperation module 226 further provides the access module 308 with instructions for performing path translations. The security cooperation module 226 also provides the access module 308 with the location of the portable registry 124 on the removable storage device 120. In addition, the security cooperation module 226 provides the access module 308 with a reference to the portable desktop 222. This reference can be a handle of the portable desktop 222 that can be used in system calls to the host operating system 202 to access the desktop. The security module 208 uses the information obtained by the access module 308 to perform an anti-malware scan of the portable environment 218.

The security module 208 may scan only some of the files in the portable file system 122, such as the files that are likely to be accessed and executed. This type of scanning is referred to as a quick scan. The security module 208 may be provided with predetermined files to scan or may scan files determined based on input from a user. User input can be obtained through the user interface module 306, described below. For example, a quick scan may include the files in the home folders and startup folders of all users and the files certain shared folders that are frequently accessed. The predetermined or user determined files are identified by their virtualized paths.

The path translation module 304 is used by the security module 208 to determine the actual paths corresponding to the virtualized paths of the files to be scanned. The path translation module 304 uses the path translation instructions obtained by the access module 308 to perform the path translations. A single path translation can be performed for all files in a particular directory for improved efficiency.

The malware detection module 302 receives the actual pathnames of the files to be scanned and determines whether those files contain malware. The malware detection module 302 also receives the location of the portable registry 124 from the access module 308 and performs an anti-malware scan of the portable registry. If the malware detection module 302 detects malware in a file in the portable file system 122 or in the portable registry 124, the malware detection module takes remedial actions such as deleting the malware or alerting a user of the portable environment 218.

The user interface module 306 provides a graphical user interface to a user of the portable environment 218, enabling the user to interact with the security module 208. The user of the portable environment 218 generally views only the portable desktop 222 and does not see other desktops of the host operating system 202. The user interface module 306 uses the portable desktop reference obtained from the access module 308 to display output to and receive input from the portable desktop 222. The user interface module 306 can also hook into graphics functions of the host operating system 202 in order to receive input from the user. For example, the user interface module 306 can display a dialog box to the user allowing the user to specify options for the anti-malware scan, including the files to be scanned during a quick scan. The user interface module 306 can also display the results of an scan performed by the malware detection module 302 and prompt the user for actions to take if malware is found. The security module 208 can use the path translation module 304 to convert actual file paths to virtualized file paths that the user of the portable environment 218 will understand.

In one embodiment, the security cooperation module 226 includes an API 230 that is used by the security module 208 to perform services. These services include path translation and user interface functions. The API 230 can provide a function that is called by the security module 208 to perform a path translation. The API 230 can also provide user interface functions that are called by the security module 208, such as a function to display a dialog box on the portable desktop 222, a function to display an icon in the system tray of the portable desktop 222, or a function to receive input from a user of the portable environment 218. If the API 230 provides path translation and user interface functions, the path translation module 304 and the user interface module 306 can be located in the security cooperation module 226 rather than in the security module 208. Additionally, in such a case, the access module 308 does not need to obtain the path translation instructions or the portable desktop reference from the security cooperation module 226.

In one embodiment, the portable environment 218 does not cooperate with the security module 208 to enable an anti-malware scan of the portable environment, as mentioned above. In this case, the portable environment 218 may not contain a security cooperation module 226. However, as described below, it is still possible for the security module 208 to obtain information to enable a scan of the portable environment 218.

The portable environment detection module 312 detects an instantiation of the portable environment 218. As mentioned above, the portable environment 218 is generally started by an application program running from the removable storage device 120. The portable environment detection module 312 can be aware of the names or properties of particular application programs that are known to be used to execute portable environments 218, and the access module 308 can detect such application programs being run. Similarly, the portable environment detection module 312 can be aware of the names or properties of particular processes that are started when a portable environment 218 is started, and can detect such processes. The portable environment detection module 312 can also use various heuristics to detect a portable environment 218 being started. For example, the portable environment detection module 312 can look for a new desktop being created (indicating a possible portable desktop 222) or look for a filter driver being started (indicating a possible portable filter driver 228).

After detecting an instantiation of the portable environment 218, the access module 308 can determine the path translation instructions by observing the path translation being performed by the portable filter drivers 228. The access module 308 can install an access filter driver 310 that links to the portable filter drivers 228 and is able to intercept the path translations being performed by the portable filter drivers. By observing pathnames before and after translation by the portable filter drivers 228 (i.e., by comparing virtualized paths to actual paths), the access filter driver 310 can determine the path translation instructions. The access filter driver 310 can also observe redirections of registry access to the portable registry 124 and determine the location of the portable registry.

The access module 308 can also create hooks into the graphics functions of host operating system 202 so that the access module is notified when the portable environment 218 creates a portable desktop 222. A hook function can also return the reference to the portable desktop 222 to the access module 308.

As mentioned above, the security module 208 uses the information obtained by the access module 308 to perform an anti-malware scan of the portable environment 218. This information can include the path translation instructions, the location of the portable registry 124, and the reference to the portable desktop 222.

Figure 4:
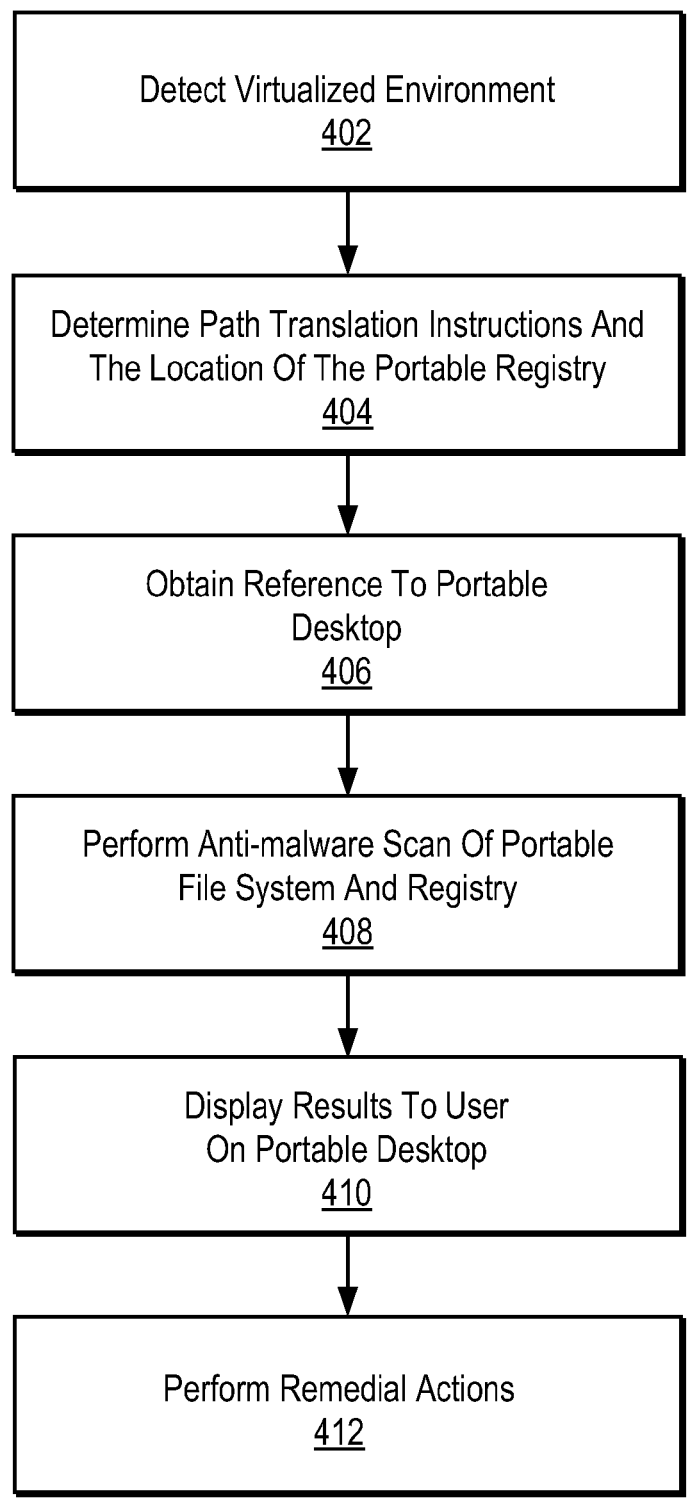
FIG. 4 is a flowchart illustrating the operation of the modules illustrated in FIGS. 2 and 3, according to one embodiment.

FIG. 4 is a flowchart illustrating the operation of the modules illustrated in FIGS. 2 and 3, according to one embodiment. Initially, the access module 308 detects 402 the portable environment 218 either through a notification from the portable environment or through the portable environment detection module 312. The access module 308 determines 404 the path translation instructions and the location of the portable registry 124. This can be accomplished by communication with the security cooperation module 226 or by observing the portable filter drivers 228 using the access filter driver 310. The access module 308 obtains 406 the reference to the portable desktop 222, again either cooperatively through the security cooperation module 226, or through creating hooks in graphics functions of the host operating system 202.

The malware detection module 302 then performs 408 an anti-malware scan of the portable file system 122 and portable registry 124. The malware detection module 302 can use the path translation instructions and portable registry location obtained by the access module or can use an API 230. The anti-malware scan can be a quick scan. The user interface module 306 displays 410 the results of the scan on the portable desktop 222 to be viewed by the user of the portable environment 218. The user interface module 306 can use the portable desktop reference obtained by the access module or can use an API 230. The malware detection module 302 performs 412 remedial actions in response to finding malware, such as deleting the malware.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A system for scanning for malware in a computer having a portable environment including a portable file system located on a removable storage device, the portable environment using virtualization in a host operating system, comprising:
   a non-transitory computer-readable storage medium storing executable computer program modules comprising:
      an access module for:
         installing an access filter driver that links to a portable filter driver of the portable environment and observes path translations being performed by the portable filter driver; and
         intercepting path translations being performed by the portable filter driver to derive path translation instructions;
      a path translation module for translating a virtualized path of a file in the portable file system to an actual path of the file based on the intercepted path translation instructions, the virtualized path being the path in the context of a portable user application running in the portable environment, the actual path being the path in the context of the host operating system; and
      a malware detection module for executing directly under the host operating system and determining whether the file contains malware using the actual path of the file.

2. The system of claim 1, further comprising:
   a user interface module for displaying a result of determining whether the file contains malware, the result displayed on a portable desktop of the portable environment.

3. The system of claim 1, wherein the access module is further for:
   detecting an instantiation of the portable environment and for determining instructions for translating the virtualized path of the file in the portable environment to the actual path of the file.

4. The system of claim 3, wherein the access module is adapted to receive a notice of the instantiation and to receive the instructions from a security cooperation module, the security cooperation module executing under the portable environment.

5. The system of claim 1, wherein the path translation module is adapted to execute under the portable environment, and wherein a path translation function of the path translation module is configured to be accessed by the malware detection module through an application programming interface.

6. The system of claim 1, wherein the malware detection module is adapted to receive the location of a portable registry of the portable environment, and wherein the access module is configured to determine whether the portable registry contains malware.

7. A computer program product having a non-transitory computer-readable medium having computer program instructions recorded thereon for scanning for malware in a computer having a portable environment including a portable file system located on a removable storage device, the portable environment using virtualization in a host operating system, comprising:
   an access module for:
      installing an access filter driver that links to a portable filter driver of the portable environment and observes path translations being performed by the portable filter driver; and
      intercepting path translations being performed by the portable filter driver to derive path translation instructions;
   a path translation module for translating a virtualized path of a file in the portable file system to an actual path of the file based on the intercepted path translation instructions, the virtualized path being the path in the context of a portable user application running in the portable environment, the actual path being the path in the context of the host operating system; and
   a malware detection module for executing directly under the host operating system and determining whether the file contains malware using the actual path of the file.

8. The computer program product of claim 7, further comprising:
   a user interface module for displaying a result of determining whether the file contains malware, the result displayed on a portable desktop of the portable environment.

9. The computer program product of claim 7, wherein the access module is further for:
   detecting an instantiation of the portable environment and for determining instructions for translating the virtualized path of the file in the portable environment to the actual path of the file.

10. The computer program product of claim 9, wherein the access module is adapted to receive a notice of the instantiation and to receive the instructions from a security cooperation module, the security cooperation module executing under the portable environment.

11. The computer program product of claim 7, wherein the path translation module is adapted to execute under the portable environment, and wherein a path translation function of the path translation module is configured to be accessed by the malware detection module through an application programming interface.

12. The computer program product of claim 7, wherein the malware detection module is adapted to receive the location of a portable registry of the portable environment, and wherein the access module is configured to determine whether the portable registry contains malware.

13. A computer-implemented method of scanning for malware in a computer having a portable environment including a portable file system located on a removable storage device, the portable environment using virtualization in a host operating system, comprising:
- linking to a portable filter driver that performs path translations for the portable environment;
- intercepting path translations being performed by the portable filter driver to derive path translation instructions;
- translating a virtualized path of a file in the portable file system to an actual path of the file based on the intercepted path translation instructions, the virtualized path being the path in the context of a portable user application running in the portable environment, the actual path being the path in the context of the host operating system; and
- determining whether the file contains malware using the actual path of the file.

14. The computer-implemented method of claim 13, further comprising:
- displaying a result of determining whether the file contains malware, the result displayed on a portable desktop of the portable environment.

15. The computer-implemented method of claim 13, further comprising:
- from a module executing directly under the host operating system, detecting an instantiation of the portable environment and determining instructions for translating the virtualized path of a file in the portable environment to the actual path of the file.

16. The computer-implemented method of claim 15, further comprising:
- receiving a notice of the instantiation and receiving the instructions.

17. The computer-implemented method of claim 13, further comprising:
- accessing a path translation function through an application programming interface.

18. The computer-implemented method of claim 13, wherein intercepting path translations comprises:
- comparing pathnames before and after translating to determine the path translation instructions.

19. The computer-implemented method of claim 13, further comprising:
- observing redirections of accesses to a registry of the host operating system to a portable registry used by the portable environment;
- determining the location of the portable registry based on the observed redirections; and
- determining whether the portable registry at the location contains malware.

* * * * *